(12) United States Patent
Park et al.

(10) Patent No.: US 11,169,586 B2
(45) Date of Patent: Nov. 9, 2021

(54) COMPUTING DEVICE AND METHOD OF OPERATING THE SAME

(71) Applicant: SAMSUNG ELECTRONICS CO., LTD., Suwon-si (KR)

(72) Inventors: Jong-lae Park, Anyang-si (KR); Dae-yeong Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

(21) Appl. No.: 16/402,565

(22) Filed: May 3, 2019

(65) Prior Publication Data

US 2019/0369704 A1 Dec. 5, 2019

(30) Foreign Application Priority Data

Jun. 1, 2018 (KR) .................. 10-2018-0063784

(51) Int. Cl.
*G06F 1/32* (2019.01)
*G06F 1/3225* (2019.01)
*G06F 1/3234* (2019.01)
*G06F 1/329* (2019.01)

(52) U.S. Cl.
CPC ............ *G06F 1/3225* (2013.01); *G06F 1/329* (2013.01); *G06F 1/3275* (2013.01)

(58) Field of Classification Search
CPC ....... G06F 1/3225; G06F 1/3275; G06F 1/329
See application file for complete search history.

(56) References Cited

U.S. PATENT DOCUMENTS

| | | | |
|---|---|---|---|
| 7,137,080 B2 | 11/2006 | Acar et al. | |
| 7,404,096 B2 | 7/2008 | Chung | |
| 7,550,987 B2 | 6/2009 | Acharyya et al. | |
| 7,814,339 B2 | 10/2010 | Monferrer et al. | |
| 7,925,899 B2 | 4/2011 | Gumma et al. | |
| 9,074,947 B2 * | 7/2015 | Ananthakrishnan | ..... G01K 7/42 |
| 9,652,026 B2 | 5/2017 | Park et al. | |
| 2009/0328055 A1 * | 12/2009 | Bose | ...................... G06F 1/3203 |
| | | | 718/105 |
| 2011/0149672 A1 | 6/2011 | Fukuoka | |
| 2013/0097609 A1 * | 4/2013 | Li | .......................... G06F 1/324 |
| | | | 718/104 |
| 2013/0262895 A1 * | 10/2013 | Kayama | ................ G06F 1/3237 |
| | | | 713/322 |
| 2013/0290758 A1 * | 10/2013 | Quick | ..................... G06F 1/324 |
| | | | 713/323 |
| 2013/0305068 A1 * | 11/2013 | Jung | ..................... G06F 1/3275 |
| | | | 713/322 |
| 2014/0068305 A1 * | 3/2014 | Watanabe | ............. G06F 1/3287 |
| | | | 713/323 |

(Continued)

*Primary Examiner* — Jaweed A Abbaszadeh
*Assistant Examiner* — Cheri L Harrington
(74) *Attorney, Agent, or Firm* — Sughrue Mion, PLLC

(57) ABSTRACT

There is provided a method of operating a computing device including a processing component based on power consumption. The method includes: obtaining power mode information about the processing component, measuring a temperature of the processing component and a current that flows through the processing component in response to the obtaining the power mode information, generating leakage power information based on the power mode information and the measured temperature and current, and storing the generated leakage power information in a memory.

18 Claims, 15 Drawing Sheets

(56) References Cited

U.S. PATENT DOCUMENTS

| | | | |
|---|---|---|---|
| 2014/0359328 A1* | 12/2014 | Burns | G06F 1/324 |
| | | | 713/322 |
| 2016/0054783 A1* | 2/2016 | Rajappa | G06F 1/3228 |
| | | | 700/291 |
| 2016/0062441 A1* | 3/2016 | Chou | G06F 1/3287 |
| | | | 713/320 |
| 2016/0073351 A1* | 3/2016 | Cardozo | G06F 1/28 |
| | | | 455/574 |
| 2016/0077136 A1* | 3/2016 | Becker | G06F 9/5094 |
| | | | 702/60 |
| 2016/0179164 A1* | 6/2016 | Park | G06F 1/3243 |
| | | | 713/322 |
| 2017/0023639 A1 | 1/2017 | Chinnakkonda Vidyapoornachary et al. | |
| 2017/0068296 A1 | 3/2017 | Mair et al. | |

* cited by examiner

FIG. 5A

| Processing component | Target PC |
|---|---|
| PC_1 | O |
| PC_2 | O |
| PC_3 | X |

| Processing component | Power mode | Target PM | MF / SL_c |
|---|---|---|---|
| PC_1 | PM_1a | O | a |
|  | PM_2a | O | b |
|  | PM_3a | X | – |
| PC_2 | PM_1b | X | – |
|  | PM_2b | O | c |
| PC_3 | PM_1c | O | d |
|  | PM_2c | X | – |
|  | PM_3c | X | – |

COMPUTING DEVICE AND METHOD OF OPERATING THE SAME

CROSS-REFERENCE TO THE RELATED APPLICATION

This application claims priority from Korean Patent Application No. 10-2018-0063784, filed on Jun. 1, 2018, in the Korean Intellectual Property Office, the disclosure of which is incorporated herein in its entirety by reference.

BACKGROUND

1. Field

Apparatuses and methods consistent with exemplary embodiments of the inventive concept relate to a computing device, and more particularly, to a computing device that operates based on power consumption and a method of operating the same.

2. Description of the Related Art

When scheduling for assigning tasks to a plurality of processing components in a computing device is performed, leakage power the processing components are considered. In order to perform the scheduling, a method of implementing complicated additional logic to obtain the leakage power of the processing components or storing data extracted from some samples in processes and utilizing the data is used. Since an area of no less than a certain size is to be secured for the complicated additional logic for obtaining the leakage power, the complicated additional logic may not be implemented. In addition, since the method of utilizing the samples extracted in the processes is not suitable for a real environment in which the computing device operates so that there is a very large error between obtained leakage power and real leakage power, the obtained leakage power is not reliable. Therefore, a method of easily, rapidly, and correctly obtaining the leakage power of the processing components is required.

SUMMARY

Exemplary embodiments of the inventive concept provide a computing device for performing efficient scheduling by rapidly and correctly obtaining leakage power of processing components by using simple logic and a method of operating the same.

According to an exemplary embodiment, there is provided a method of operating a computing device including a processing component. The method may include: obtaining power mode information about the processing component, measuring a temperature of the processing component and a current that flows through the processing component in response to the obtaining the power mode information, generating leakage power information based on the power mode information and the measured temperature and current, and storing the generated leakage power information in a memory.

According to an exemplary embodiment, there is provided a computing device which may include: a processing component; a memory configured to store a leakage power table including information about a plurality of power modes of the processing component; and at least one processor configured to control a leakage power management module to manage the leakage power table for the processing component, wherein the leakage power management module is configured to obtain information about a temperature of the processing component and a current which flows through the processing component by power mode of the processing component, and manage the leakage power table by using the information about the temperature and the current.

According to an exemplary embodiment, there is provided a processor controlling a leakage power management module which may be configured to: obtain power mode information about a processing component; obtain information about a temperature of the processing component and a current which flows through the processing component in response to the obtaining the power mode information; generate leakage power information based on the temperature and the current; and provide the leakage power information to an external component or device, which schedules a task of the processing component based on the leakage power information.

BRIEF DESCRIPTION OF THE DRAWINGS

Embodiments of the inventive concept will be more clearly understood from the following detailed description taken in conjunction with the accompanying drawings in which:

FIG. 5A is a view illustrating information about whether processing components are targets of leakage power measurement according to an embodiment;

FIG. 7A is a view illustrating third information referred to in the case in which previously set dynamic power is consumed when a processing component operates in a target power mode, according to an embodiment;

DETAILED DESCRIPTION OF THE EXEMPLARY EMBODIMENTS

Figure 1:
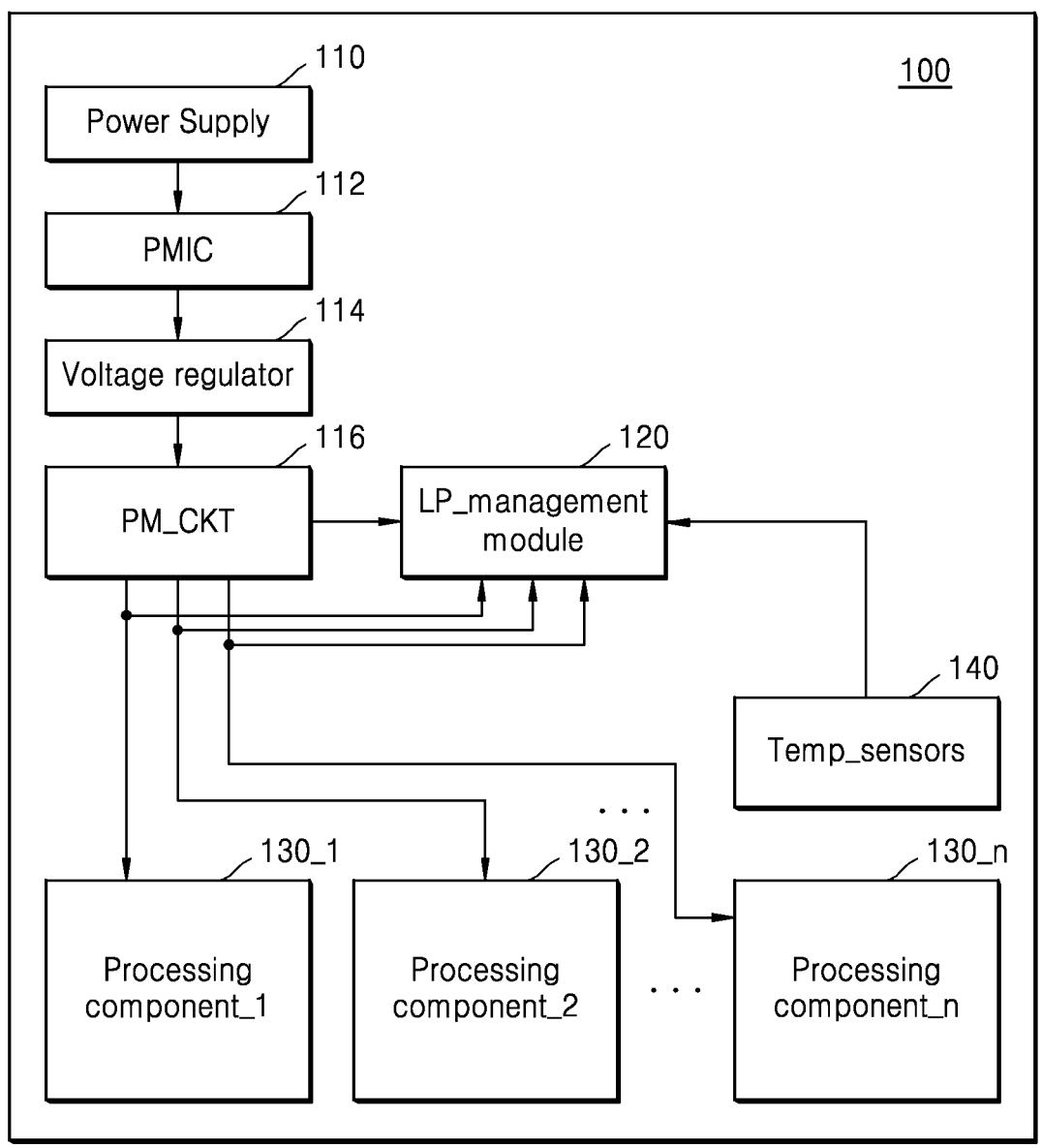
FIG. 1 is a block diagram illustrating a computing device, according to an embodiment.

Hereinafter, exemplary embodiments of the inventive concept will be described in detail with reference to the accompanying drawings. It will be noted that these embodiments are all exemplary, but the inventive concept may be embodied in many different forms and should not be construed as limited to the embodiments set forth herein. Rather, these embodiments are provided so that this description will be thorough and complete, and will fully convey the scope of the inventive concept to those skilled in the art. In the drawings, the sizes and relative sizes of layers and regions may be exaggerated for clarity.

An embodiment provided in the following description is not excluded from being associated with one or more features of another example or another embodiment also provided herein or not provided herein but consistent with the inventive concept. For example, even if matters described in a specific example are not described in a different example thereto, the matters may be understood as being related to or combined with the different example, unless otherwise mentioned in descriptions thereof.

Meanwhile, when an embodiment can be implemented differently, functions or operations described in a particular block may occur in a different way from a flow described in the flowchart. For example, two consecutive blocks may be performed simultaneously, or the blocks may be performed in reverse according to related functions or operations.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a computing device 100 according to an embodiment.

Referring to FIG. 1, the computing device 100 may include a power supply 110, a power management integrated circuit 112, a voltage regulator 114, a power management circuit 116, a leakage power management module 120, a plurality of processing components, for example, first to $n^{th}$ processing components 130_1 to 130_n, and at least one temperature sensor 140. The power supply 110 may be implemented by a battery or an alternate current (AC) power source as a power source. Power output from the power supply 110 may be supplied by the PMIC 112 to the first to $n^{th}$ processing components 130_1 to 130_n through the voltage regulator 114, the power management circuit 116, and a plurality of power rails. The first to $n^{th}$ processing components 130_1 to 130_n may perform the same operations or different operations. For example, the first processing component 130_1 may be a central processing unit (CPU) or a graphics processing unit (GPU) including a plurality of cores, the second processing component 130_2 may be a camera subsystem, and the $n^{th}$ processing component 130_n may be a modem. In addition, the first to $n^{th}$ processing components 130_1 to 130_n may be implemented by a system on chip (SOC), which is only an example. Therefore, the first to $n^{th}$ processing components 130_1 to 130_n may be variously implemented so as to perform the same operations or different operations.

The power management circuit 116 may control power modes of the first to nth processing components 130_1 to 130_n, and may provide power suitable for the power modes to the first to nth processing components 130_1 to 130_n through the power rails. Types of the power modes of the first to $n^{th}$ processing components 130_1 to 130_n may be the same or different from each other. The power management circuit 116 may provide the leakage power management module 120 with power mode information when the power modes are changed when the power modes of the first to $n^{th}$ processing components 130_1 to 130_n are changed. For example, the power mode information may include information about new power modes (or information that indicates new power modes) changed from previous power modes and information about a time point at which the first to $n^{th}$ processing components 130_1 to 130_n enter the new power modes. In detail, when the first processing component 130_1 changes from a first mode to a second mode, the power management circuit 116 may provide the leakage power management module 120 with the power mode information including information about the second power mode and information about a time point at which the first processing component 130_1 enters the second power mode. The leakage power management module 120 is connected to power rails between the power management circuit 116 and the first to $n^{th}$ processing components 130_1 to 130_n, and may monitor currents (or power) that flow through the first to $n^{th}$ processing components 130_1 to 130_n.

The leakage power management module 120 according to an embodiment may generate leakage power information about power modes of the first to $n^{th}$ processing components 130_1 to 130_n based on power mode information received from the power management circuit 116, information about temperatures of the first to n$^{th}$ processing components 130_1 to 130_n measured by temperature sensors 140, and currents that flow through the first to n$^{th}$ processing components 130_1 to 130_n. According to an embodiment, the leakage power management module 120 may generate the leakage power information about power modes of only target processing components in which ratios of leakage power to power consumptions are no less than threshold values during operations. The information about the target processing components is previously stored in the leakage power management module 120 or may be generated by the leakage power management module 120 monitoring the currents that flow through the first to n$^{th}$ processing components 130_1 to 130_n, which will be described in detail in FIGS. 5A and 5B. Hereinafter, an operation of the leakage power management module 120 generating leakage power information about the power modes of the first processing component 130_1 will be described in detail.

According to an embodiment, the leakage power management module 120 may obtain power mode information about the first processing component 130_1 from the power management circuit 116. The leakage power management module 120 may obtain information about a temperature of the first processing component 130_1, measured by the temperature sensor 140, and measure a current that flows through the first processing component 130_1 based on the power mode information obtained from the power management circuit 116. According to an embodiment, the leakage power management module 120 may generate leakage power information about only at least one target power mode among the power modes of the first processing component 130_1. Therefore, when the first processing component 130_1 is not in a target power mode among a plurality of power modes, the temperature of the first processing component 130_1 and the current that flows through the first processing component 130_1 may not be measured or information thereabout may not be obtained. In the target power mode that is a target of leakage power measurement, for example, when the first processing component 130_1 is in the target power mode, power consumption of the first processing component 130_1 includes only leakage power, or leakage power in comparison with power consumption of the first processing component 130_1 may be higher than a threshold value. Information about the target power modes of the first to n$^{th}$ processing components 130_1 to 130_n may be previously stored in the leakage power management module 120, which will be described in detail in FIGS. 6A to 6C.

The leakage power management module 120 may generate the leakage power information based on the power mode information by using the measured temperature and current. The leakage power management module 120 may generate the leakage power information by reflecting a type of the power mode indicated by the power mode information. According to an embodiment, when the power consumption of the first processing component 130_1 includes a dynamic power component and a leakage power component in the target power mode, the leakage power management module 120 may generate the leakage power information considering the dynamic power component. In addition, when the power consumption of the first processing component 130_1 in the target power mode includes only the leakage power component, the leakage power management module 120 may generate the leakage power information by using the measured temperature and current as they are. That is, since the current that flows through the first processing component 130_1 depends on the leakage power of the first processing component 130_1, the leakage power may be easily and correctly obtained (or estimated) by measuring the current, which will be described in detail in FIGS. 7A and 7B.

The leakage power management module 120 may store the generated leakage power information in a memory such as a buffer in the leakage power management module 120. Specifically, the leakage power management module 120 may update a leakage power table corresponding to the first processing component 130_1 stored in the buffer by using the generated leakage power information. In addition, at an initial stage of booting the computing device 100, the leakage power table corresponding to the first processing component 130_1 may be filled with arbitrary values (for example, null values). The arbitrary values may be replaced by the generated leakage power information. Leakage power information about the power modes of the second to n$^{th}$ processing components 130_2 to 130_n is generated by the above method, and may be stored in the buffer.

When the first to n$^{th}$ processing components 130_1 to 130_n operate in target power modes, the computing device 100 according to an embodiment may easily and rapidly obtain correct leakage power by measuring currents and temperatures of the first to n$^{th}$ processing components 130_1 to 130_n. In addition, the computing device 100 may efficiently perform task scheduling on the first to n$^{th}$ processing components 130_1 to 130_n considering the correct leakage power.

Figure 2:
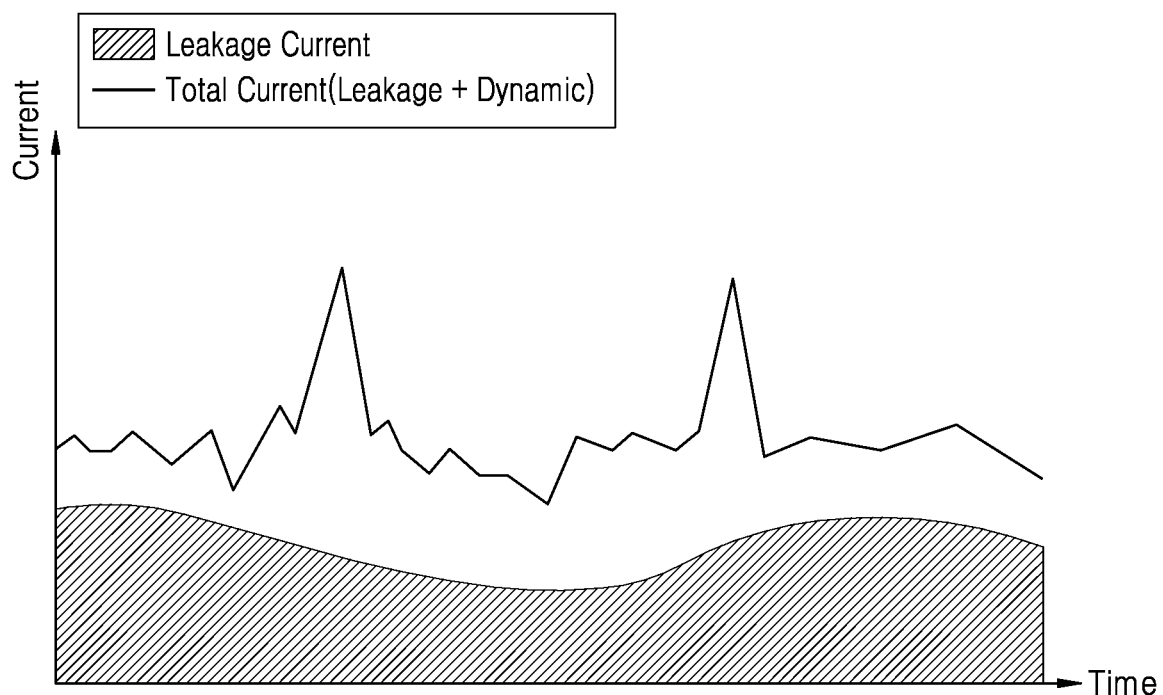
FIG. 2 is a graph illustrating power consumption when a processing component in a computing device operates, according to an embodiment.

FIG. 2 is a graph illustrating power consumption when a processing component in a computing device operates.

Referring to FIG. 2, total power consumed by a processing component operating in a previously set power mode may include leakage power and dynamic power. According to FIG. 2, the leakage current means the leakage power, the dynamic power means the dynamic current, and the total power may mean the total current.

The computing device 100 may consider power consumed by a current processing component when the task scheduling is performed on this processing component. Also, the computing device 100 may schedule a task by determining whether the task may be smoothly performed based on power currently consumed by the first processing component. That is, the computing device 100 may operate based on energy aware scheduling.

The dynamic power may be easily obtained by using a voltage applied to a processing component and a frequency of a signal. However, it is difficult to obtain the leakage power. Therefore, when it is determined that a small amount of power is consumed by a certain processing component without considering leakage power of the processing component and a lot of tasks are assigned to this processing component, this processing component may consume a large amount of dynamic power in order to process a large amount of tasks and the consumed dynamic power is added to previous leakage power so that a larger amount of power than expected may be consumed by the processing component. At this time, it is difficult for this processing component to perform an efficient operation. Furthermore, the computing device 100 may not efficiently use power. In particular, when the computing device 100 is a device sensitive to battery use efficiency or battery usable time like a mobile device, the above problem may be severer. In order to address the problem, the computing device 100 (refer to FIG. 1) according to the present embodiment easily and correctly measures leakage power of power modes of the first to n$^{th}$ processing components 130_1 to 130_n, stores leakage power information, and performs task scheduling by using the stored leakage power information when the first to $n^{th}$ processing components 130_1 to 130_n actually operate so that the computing device 100 (refer to FIG. 1) may efficiently use power.

Figure 3:
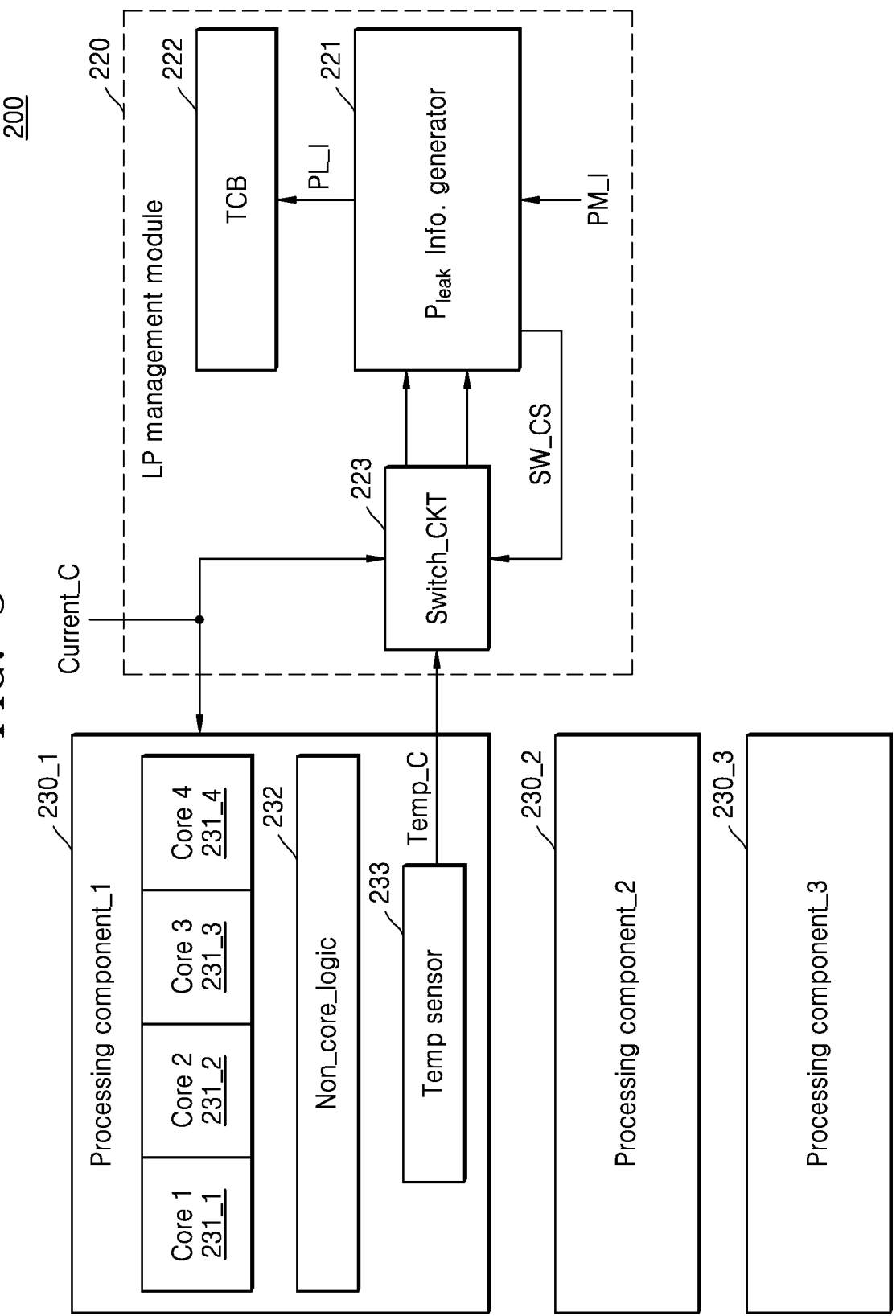
FIG. 3 is a block diagram illustrating a computing device, according to an embodiment.

FIG. 3 is a block diagram illustrating a computing device 200 according to an embodiment.

Referring to FIG. 3, the computing device 200 may include a leakage power management module 220 and first to third processing components 230_1 to 230_3. The leakage power management module 220 may include a leakage power information generator 221, a buffer TCB 222, and a switch circuit 223. The first processing component 230_1, which may be a CPU, may include a plurality of cores 231_1 to 231_4, a non-core logic 232, and a temperature sensor 233. The first processing component 230_1 may be in a plurality of power modes in accordance with states of the cores 231_1 to 231_4 and the non-core logic 232. Hereinafter, it is assumed that the first processing component 230_1 is a target processing component of leakage power measurement.

According to an embodiment, the switch circuit 223 may be connected to a power rail that provides power to the first processing component 230_1 and the temperature sensor 233. Through the above connection configuration, the switch circuit 223 may receive information about a current Current_C that flows through the first processing component 230_1 and a temperature Temp_C of the first processing component 230_1.

According to an embodiment, the leakage power information generator 221 may receive power mode information PM_I from the power management circuit 116 (refer to FIG. 1). The power mode information PM_I informing that a power mode of the first processing component 230_1 changes may include information about a new power mode to which the first processing component 230_1 changes and information about a time point at which the first processing component 230_1 enters the new power mode.

The leakage power information generator 221 may determine whether the new power mode indicated by the power mode information PM_I is a target power mode that is a target of leakage power measurement. The leakage power information generator 221 may previously store information about target power modes of the plurality of processing components including the first processing component 230_1. When the new power mode is the target power mode, the leakage power information generator 221 may provide a switch control signal SW_CS to the switch circuit 223 at the time point at which the first processing component 230_1 enters the new power mode with reference to information about the time point at which the first processing component 230_1 enters the new power mode. The switch circuit 223 may provide information about a current Current_C and a temperature Temp_C received in response to the switch control signal SW_CS to the leakage power information generator 221.

The leakage power information generator 221 may obtain the information about the current Current_C and the temperature Temp_C, generate leakage power information PL_I by using the obtained information about the current Current_C and the temperature Temp_C, and store the leakage power information PL_I in the buffer TCB 222. The leakage power information generator 221 may determine whether the temperature and the current are effective based on the power mode information PM_I. For example, the leakage power information generator 221 may check that a previously set power mode is changed to a new power mode before current Current_C and the temperature Temp_C are completely measured in the previously set power mode through the power mode information PM_I received later. When the previously set power mode is changed to the new power mode before the measurement is completed, the leakage power information generator 221 invalidates previously measured values and may delete the values. As described above, the leakage power information generator 221 may secure the smallest time for correctly measuring the current Current_C and the temperature Temp_C in a previously set power mode.

Figure 4:
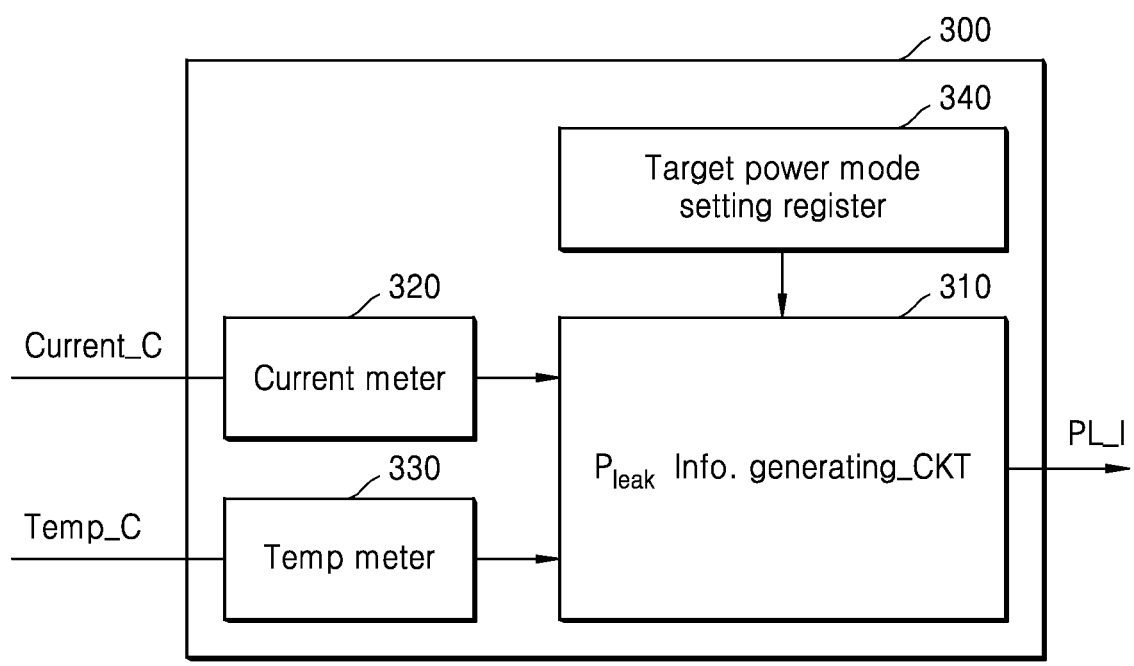
FIG. 4 is a block diagram specifically illustrating a leakage power information generator, according to an embodiment.

FIG. 4 is a block diagram specifically illustrating a leakage power information generator 300 according to an embodiment.

Referring to FIG. 4, the leakage power information generator 300 may include a leakage power information generating circuit 310, a current meter 320, a temperature meter 330, and a target power mode setting register 340. As illustrated in FIG. 3, the target power mode setting register 340 may store information about at least one target power mode that is a target of leakage power measurement among power modes of at least one processing component that is a target of the leakage power measurement. The information stored in the target power mode setting register 340 may be periodically updated, and may be changed (or modified) by an external signal.

The leakage power information generating circuit 310 may determine whether a new power mode to which a previously set power mode of a processing component changes is a target power mode with reference to information stored in the target power mode setting register 340. When it is determined that the new power mode to which the previously set power mode of the processing component changes is the target power mode, the leakage power information generating circuit 310 controls the current meter 320 and the temperature meter 330 to measure the current Current_C that flows through the processing component and the temperature Temp_C of the processing component.

The leakage power information generating circuit 310 may generate leakage power information PL_I based on the measured current and temperature. The leakage power information PL_I may include a field that represents a power mode of the processing component, a field that represents the measured temperature of the processing component, and a field that represents the measured current that flows through the processing component. That is, through the leakage power information PL_I, it is possible to obtain information about a current that flows through the processing component at a certain temperature in a certain power mode, thereby to obtain leakage power of the processing component.

Figure 5B:
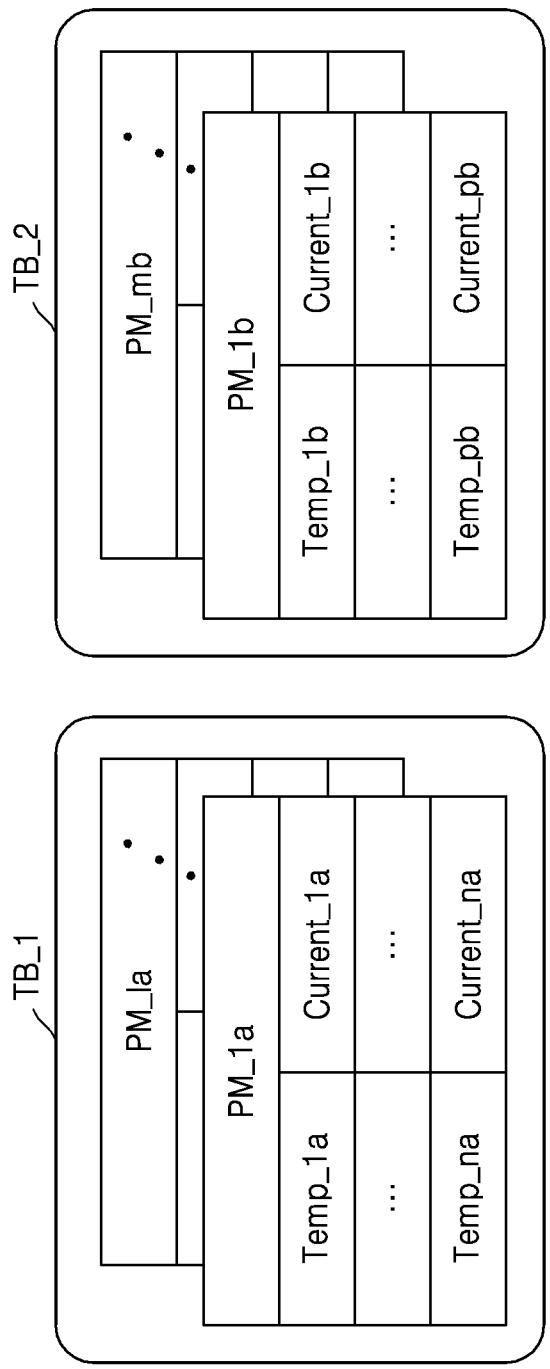
FIG. 5B is a view illustrating a leakage power table stored in a buffer in accordance with the information of FIG. 5A, according to an embodiment.

FIG. 5A is a view illustrating information about whether processing components are targets of leakage power measurement, and FIG. 5B is a view illustrating a leakage power table stored in a buffer in accordance with the information of FIG. 5A. FIGS. 5A and 5B will be described with reference to FIG. 3.

Referring to FIG. 5A, information SI_a may represent that the first processing component (PC_1) 230_1 and the second processing component (PC_2) 230_2 are targets of leakage power measurement, and the third processing component (PC_3) 230_3 is not a target of leakage power measurement.

The leakage power management module 220 may perform the leakage power measurement only on the first processing component (PC_1) 230_1 and the second processing component (PC_2) 230_2 with reference to the information SI_a.

Referring to FIG. 5B, the leakage power management module 220 may update a first leakage power table TB_1 corresponding to the first processing component (PC_1) 230_1 and a second leakage power table TB_2 corresponding to the second processing component (PC_2) 230_2 by performing the leakage power measurement on the first processing component (PC_1) 230_1 and the second processing component (PC_2) 230_2.

For example, the first processing component (PC_1) 230_1 may have a plurality of power modes PM_1a to PM_1a, and the first leakage power table TB_1 is divided into the power modes PM_1a to PM_1a and may include information arranged by temperatures in the power modes PM_1a to PM_1a and currents (or leakage currents) corresponding to the temperatures. The second processing component (PC_2) and 230_2 may have a plurality of power modes PM_1b to PM_mb, and the second leakage power table TB_2 is divided into the power modes PM_1b to PM_mb and may include information arranged by temperatures in the power modes PM_1b to PM_mb and currents (or leakage currents) corresponding to the temperatures. The first processing component (PC_1) 230_1 and the second processing component (PC_2) 230_2 may have the same power mode or different power modes.

Figure 6A:
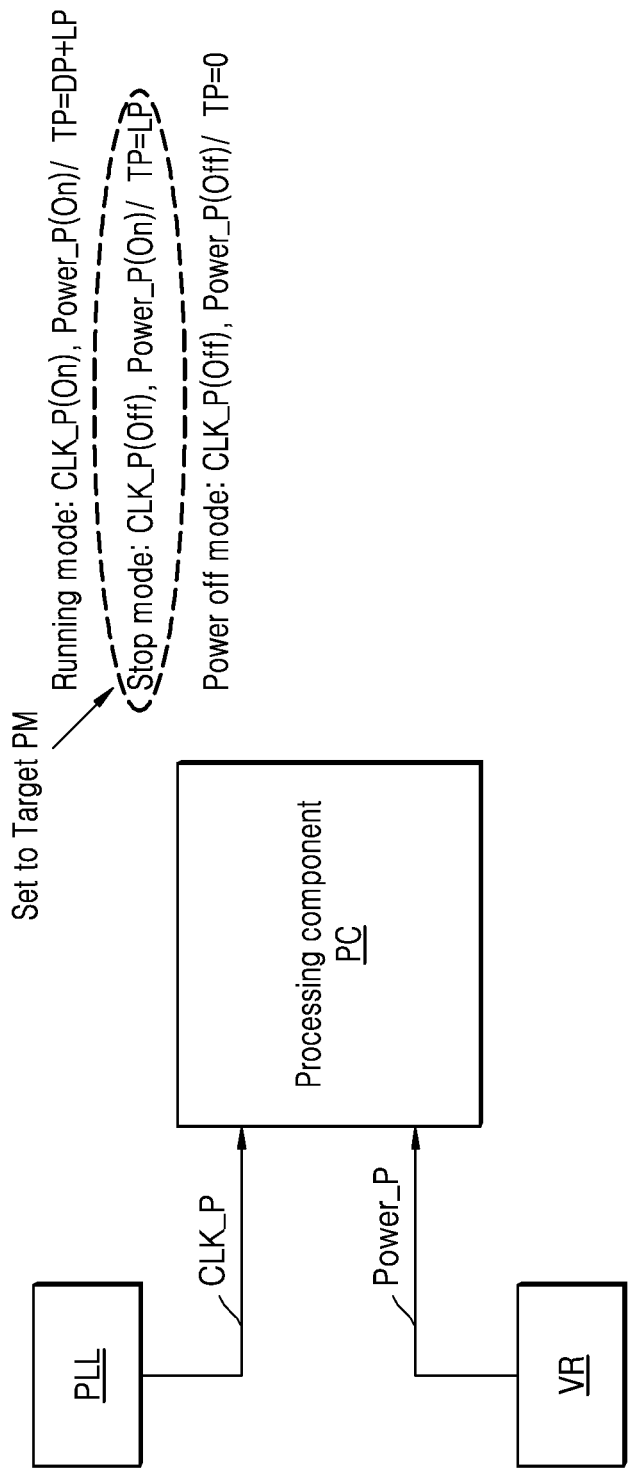
FIG. 6A is a view illustrating a power mode that is a target of leakage power measurement, according to an embodiment.
Figure 6B:
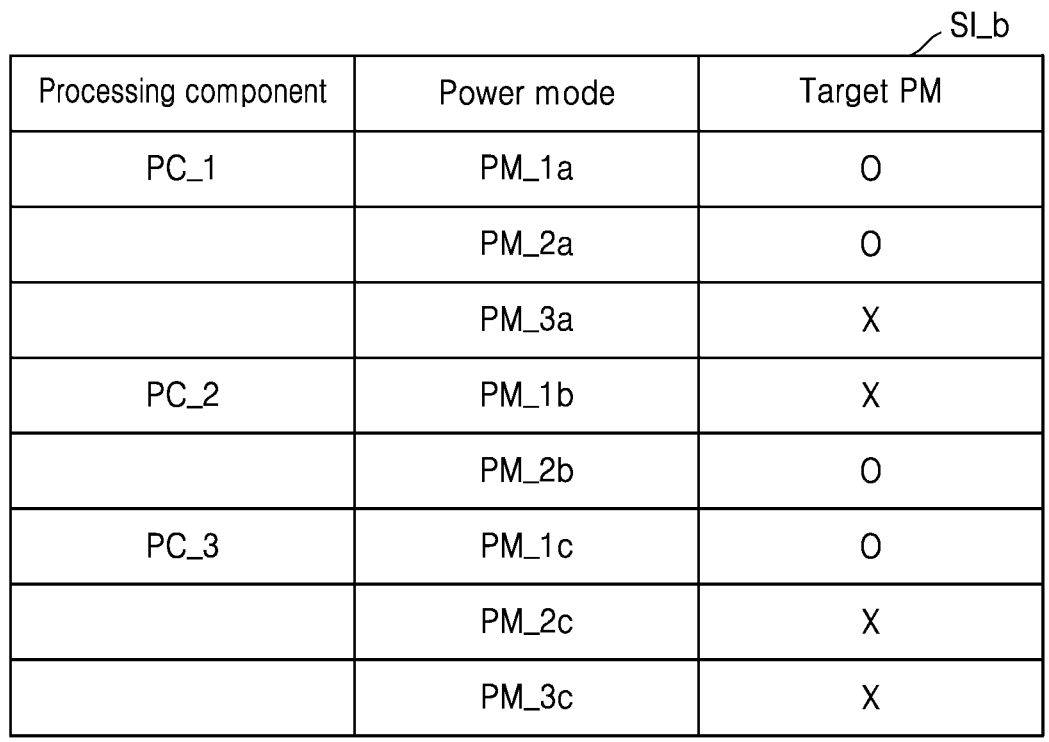
FIG. 6B is a view illustrating second information about whether power modes of processing components are targets of leakage power measurement, according to an embodiment.
Figure 6C:
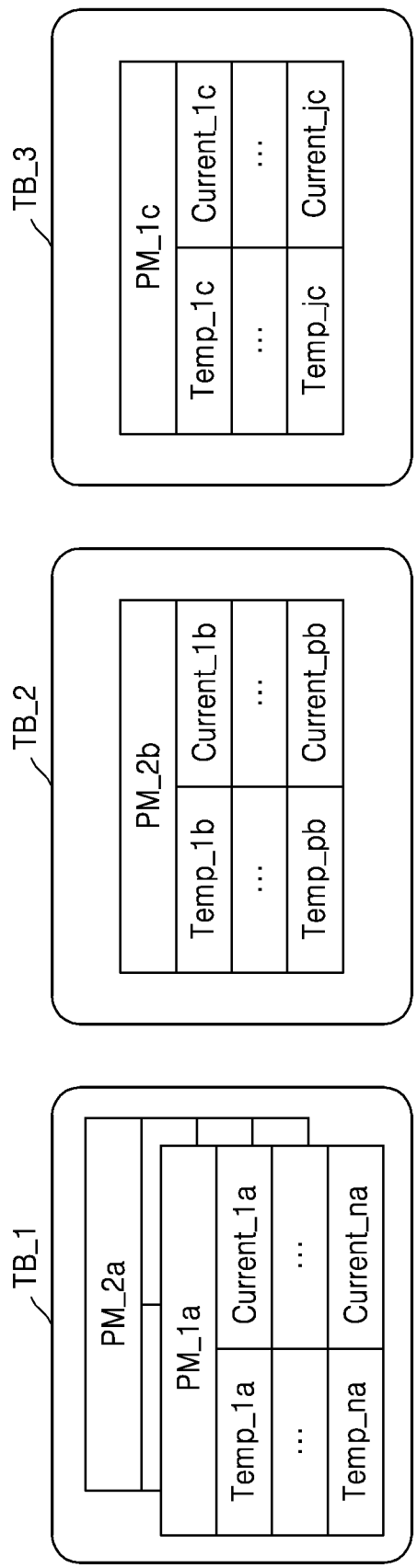
FIG. 6C is a view illustrating a leakage power table stored in a buffer in accordance with the second information of FIG. 6B, according to an embodiment.

FIG. 6A is a view illustrating a power mode that is a target of leakage power measurement. FIG. 6B is a view illustrating information about whether power modes of processing components are targets of leakage power measurement. FIG. 6C is a view illustrating a leakage power table stored in a buffer in accordance with information of FIG. 6B. FIGS. 6B and 6C will be described with reference to FIG. 3.

Referring to FIG. 6A, a processing component (PC) may be connected to a phase locked loop (PLL) circuit and a voltage regulator (VR). The PC receives a clock signal from the PLL through a clock supply path CLK_P, and may receive power from the VR through a power supply path Power_P. For example, a plurality of power modes that the PC may have include a running mode, a stop mode, and a power-off mode.

In the running mode, both the clock supply path CLK_P and the power supply path Power_P are turned on. Total power consumed when the PC is in the running mode may include dynamic power and leakage power. In the stop mode, the clock supply path CLK_P is turned off and the power supply path Power_P is turned on. Total power consumed when the PC is in the stop mode may include only leakage power. In the power-off mode, both the clock supply path CLK_P and the power supply path Power_P are turned off. Total power consumed when the PC is in the power-off mode may have a value of 0.

At this time, the stop mode may be set as the target power mode, and the leakage power management module 220 may perform the leakage power measurement when the PC is in the stop mode, which is only exemplary. The inventive concept is not limited thereto. The target power mode may be set based on various references. A power mode in which it is estimated that a ratio of leakage power to power consumption is not less than a threshold value may be set as the target power mode. Furthermore, the target power mode may be set based on various references.

Referring to FIG. 6B, the information SI_b may represent that the power mode PM_1a and the power mode PM_2a of the first processing component (PC_1) 230_1 are target power modes, the power mode 'PM_2b' of the second processing component (PC_2) 230_2 is a target power mode, and the power mode 'PM_1c' of the third processing component (PC_3) 230_3 is a target power mode. The information SI_b may be stored in the target power mode setting register 240 of FIG. 4, may be periodically updated, and may be changed (or modified) by an external signal.

Referring to FIG. 6C, the leakage power management module 220 may update the first leakage power table TB_1 corresponding to the first processing component (PC_1) 230_1, the second leakage power table TB_2 corresponding to the second processing component (PC_2) 230_2, and a third leakage power table TB_3 corresponding to the third processing component (PC_3) 230_3 by performing leakage power measurement on the first to third processing components (PC_1 to PC_3) 230_1 to 230_3 based on the information SI_b. As a result, the first leakage power table TB_1 includes information corresponding to the power mode 'PM_1a' and the power mode 'PM_2a', the second leakage power table TB_2 includes information corresponding to the power mode 'PM_2b', and the third leakage power table TB_3 may include information corresponding to the power mode 'PM_1c'.

Figure 7B:
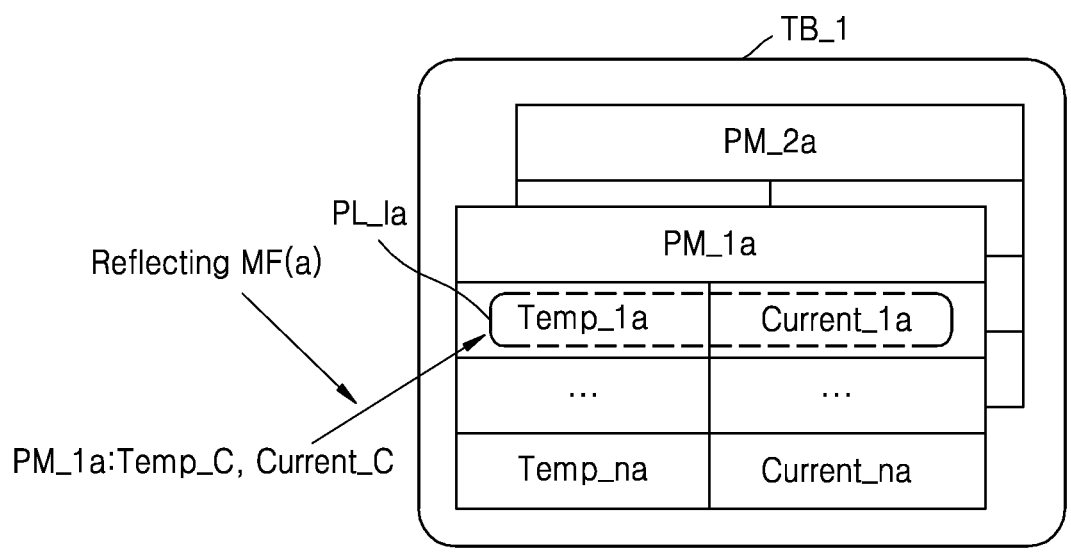
FIG. 7B is a view illustrating a leakage power table stored in a buffer in accordance with the third information of FIG. 7A, according to an embodiment.

FIG. 7A is a view illustrating information referred to in a case in which previously set dynamic power is consumed when a processing component operates in a target power mode. FIG. 7B is a view illustrating a leakage power table stored in a buffer in accordance with the information of FIG. 7A. According to an embodiment, when a processing component consumes dynamic power of less than a threshold value in a previously set power mode, since the power mode may be set as a target power mode, in order to correctly measure leakage power, the leakage power management module 220 may refer to information SI_c.

Referring to FIG. 7A, the third information SI_c may include modification factors (MF) corresponding to the target power modes PM_1a, PM_2a, PM_2b, and PM_1c of the first to third processing components (PC_1 to PC_3) 230_1 to 230_3. The MFs may be determined based on specifications during manufacturing processes of the first to third processing components (PC_1 to PC_3) 230_1 to 230_3, and states of internal components of the first to third processing components (PC_1 to PC_3) 230_1 to 230_3 in the target power modes PM_1a, PM_2a, PM_2b, and PM_1c.

For example, an MF corresponding to the power mode PM_1a of the first processing component (PC_1) 230_1 has a value 'a' and an MF corresponding to the power mode PM_2a may have a value 'b'. An MF corresponding to the power mode PM_2b of the second processing component (PC_2) 230_2 may have a value 'c'. An MF corresponding to the power mode 'PM_1c' of the third processing component (PC_3) 230_3 may have a value 'd'. The information SI_c may be stored in the target power mode setting register 240 of FIG. 4, may be periodically updated, and may be changed (or modified) by an external signal.

Referring to FIG. 7B, the leakage power management module 220 performs leakage power measurement for the target power modes of the first to third processing components (PC_1 to PC_3) 230_1 to 230_3 based on the information SI_c, and may modify at least one of the measured temperature and current considering respective dynamic power components. For example, the leakage power management module 220 may modify at least one of the temperature Temp_C and the current Current_C that are measured in the power mode PM_1a of the first processing component (PC_1) 230_1 reflecting the MF having the value 'a'. Leakage power information PL_1a is generated by using the modification result and may be stored in the first leakage power table TB_1. The leakage power management module 220 may manage the leakage power tables corresponding to the other processing components (PC_2 and PC_3) 230_2 and 230_3 by the above method.

Figure 8:
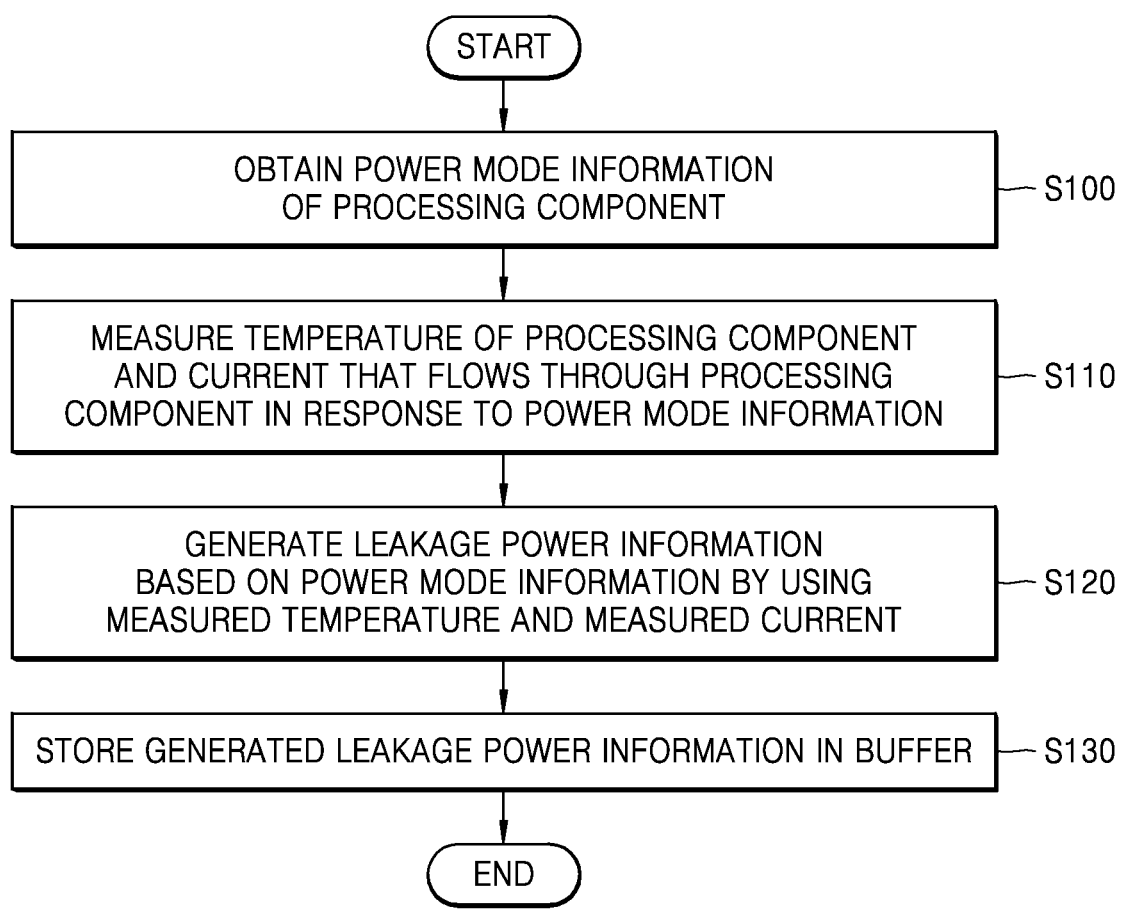
FIG. 8 is a flowchart illustrating a method of operating a leakage power management module, according to an embodiment.

FIG. 8 is a flowchart illustrating a method of operating a leakage power management module, according to an embodiment.

Referring to FIG. 8, a leakage power management module may obtain power mode information about a processing component in operation S100. The leakage power management module may measure a temperature of the processing component and a current that flows through the processing component, in response to the obtaining of the power mode information in operation S110. The leakage power management module may generate leakage power information based on the power mode information by using the measured temperature and current in operation S120. The leakage power management module may store the generated leakage power information in a buffer in operation S130.

Figure 9:
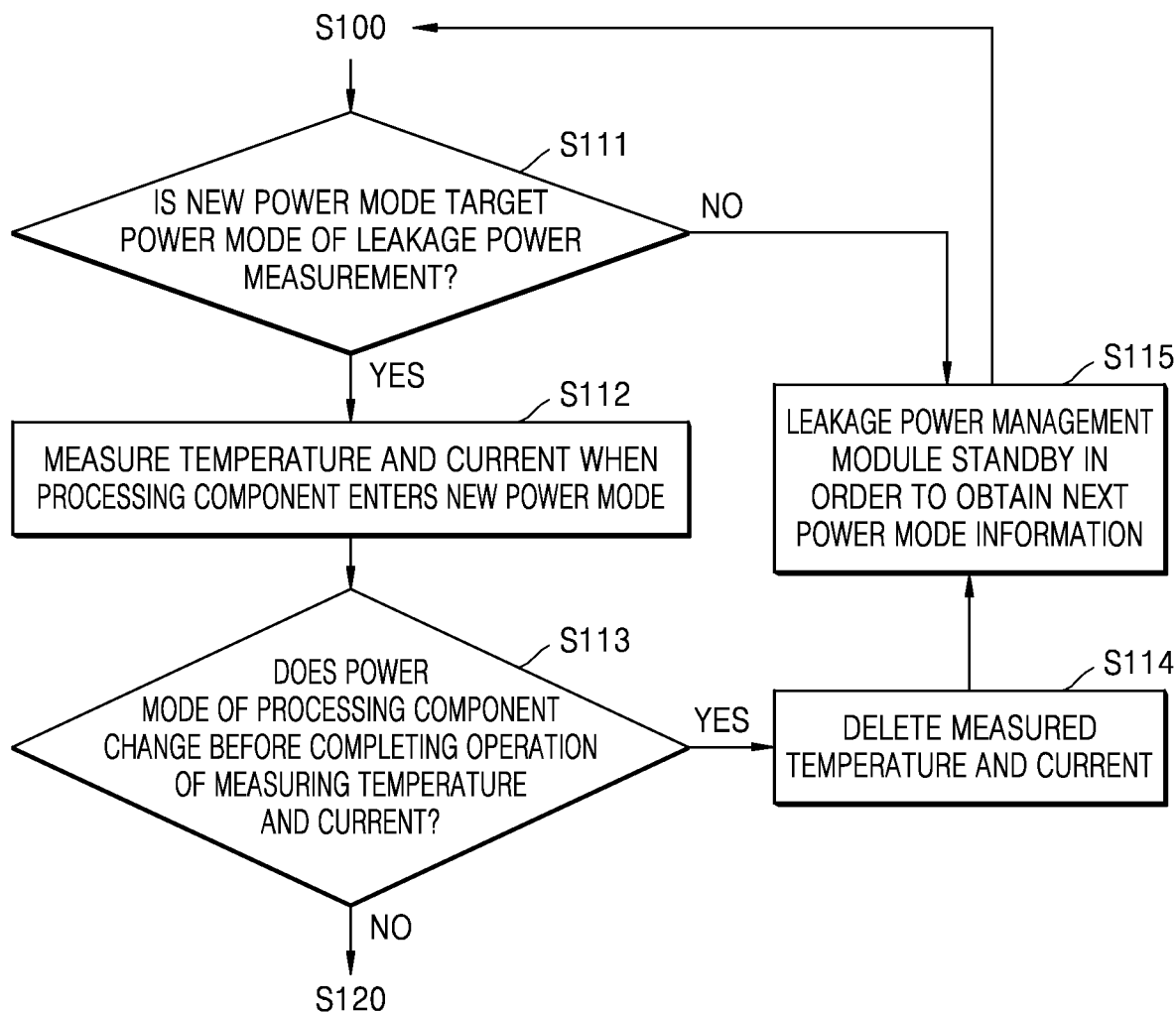
FIG. 9 is a flowchart specifically illustrating operation S110 of FIG. 8, according to an embodiment.

FIG. 9 is a flowchart specifically illustrating operation S110 of FIG. 8.

Referring to FIG. 9, after operation S100 (FIG. 8), the leakage power management module may determine whether a new power mode indicated by the power mode information is a target power mode of leakage power measurement in operation S110. When it is determined that the new power mode is the target power mode in operation S111 (YES), the leakage power management module may measure the temperature and the current when the processing component enters the new power mode in operation S112.

The leakage power management module may check whether the power mode of the processing component changes before completing the temperature and current measuring operation in operation S113. When it is checked that the power mode changes in operation S113 (YES), the leakage power management module may invalidate the previously measured temperature and current and delete the temperature and the current in operation S114. When it is checked that the power mode does not change in operation S113 (NO), the leakage power management module may perform operation S120 (FIG. 8).

When the new power mode is not the target power mode in operation S111 (NO) or after operation S114, the leakage power management module may standby in order to obtain next power mode information in operation S115. The leakage power management module may perform operation S100 (FIG. 8) when the next power mode information is obtained.

Figure 10:
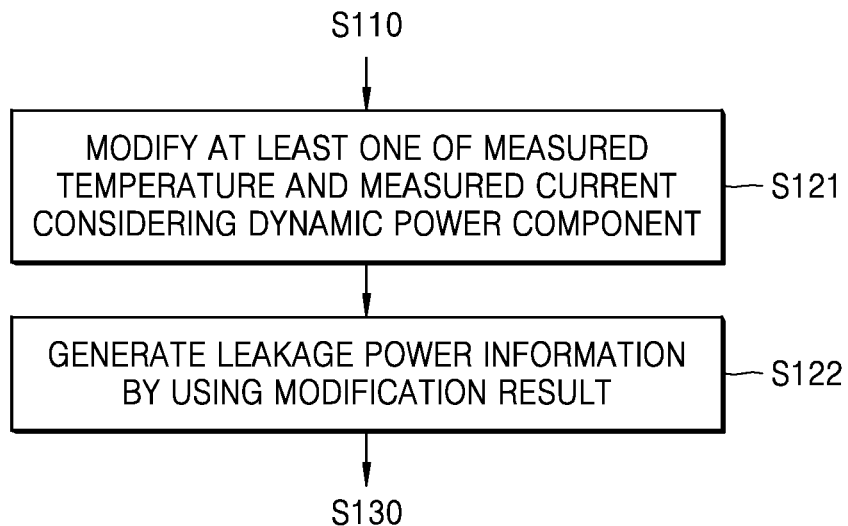
FIG. 10 is a flowchart specifically illustrating operation S120 of FIG. 8, according to an embodiment.

FIG. 10 is a flowchart specifically illustrating operation S120 of FIG. 8.

Referring to FIG. 10, after operation S110 (FIG. 8), the leakage power management module may modify at least one of the measured temperature and the measured current considering a dynamic power component of power consumption of the processing component in the target power mode in operation S121. The leakage power management module may generate leakage power information by using the modification result in operation S122. Then, the leakage power management module may perform operation S130 (FIG. 8).

Figure 11:
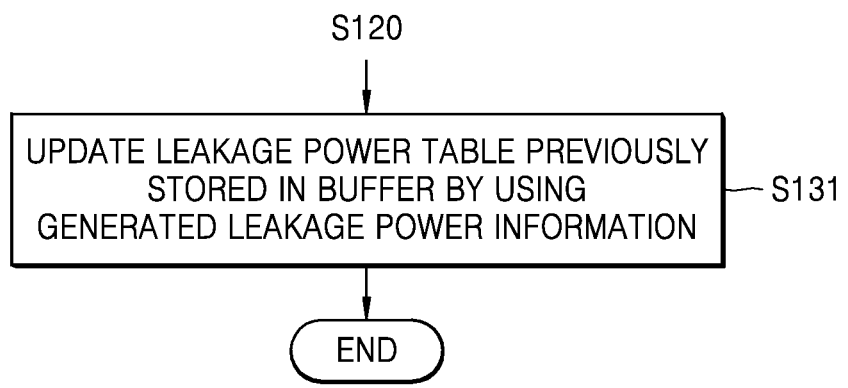
FIG. 11 is a flowchart specifically illustrating operation S130 of FIG. 8, according to an embodiment.

FIG. 11 is a flowchart specifically illustrating operation S130 of FIG. 8.

Referring to FIG. 11, after operation S120 (FIG. 8), the leakage power management module may update the leakage power table stored in the buffer by using the generated leakage power information in operation S131.

Figure 12:
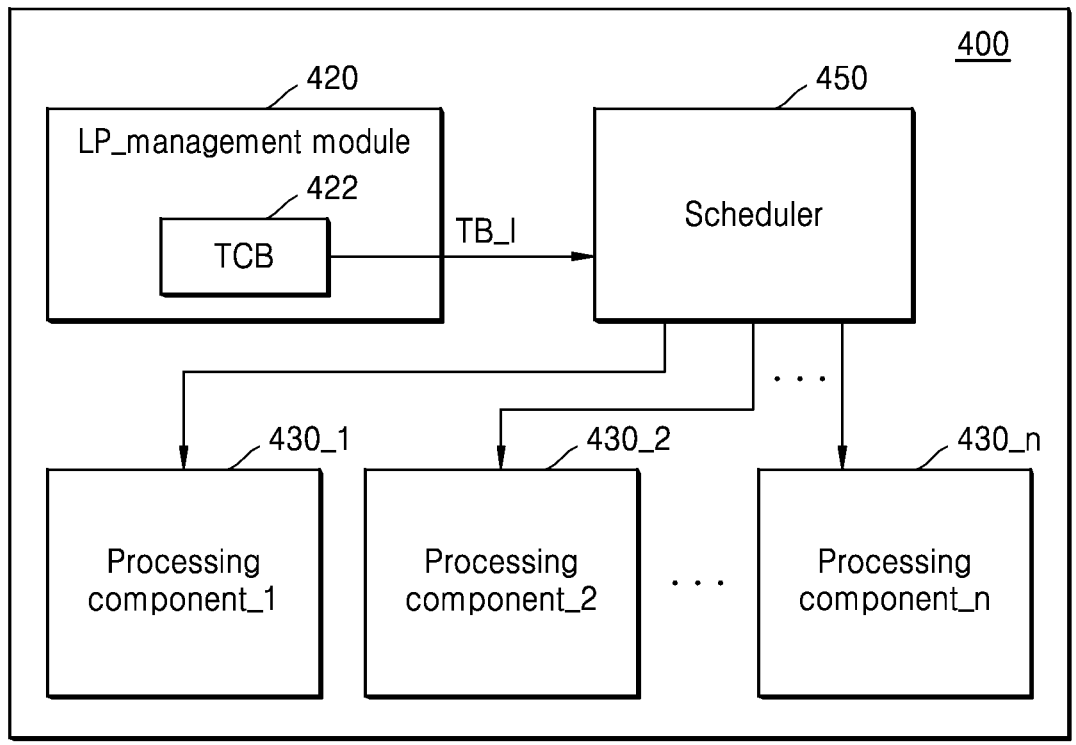
FIG. 12 is a block diagram of a computing device for describing a method of utilizing a leakage power table, according to an embodiment for task scheduling, according to an embodiment.

FIG. 12 is a block diagram of a computing device 400 for describing a method of utilizing a leakage power table for task scheduling, according to an embodiment.

Referring to FIG. 12, the computing device 400 may include a leakage power management module 420, a plurality of processing components 430_1 to 430_n, and a scheduler 450. The scheduler 450 may read a leakage power table from a buffer 422 of the leakage power management module 420, may extract, from the leakage power table (or leakage power information), information about a current corresponding to a current power mode of the processing component (for example, 430_1) and a current temperature of the processing component 430_1, and may correctly estimate leakage power of the processing component from the extracted current. The scheduler 450 may perform task scheduling on the processing component 430_1 based on a result of the estimation.

Figure 13:
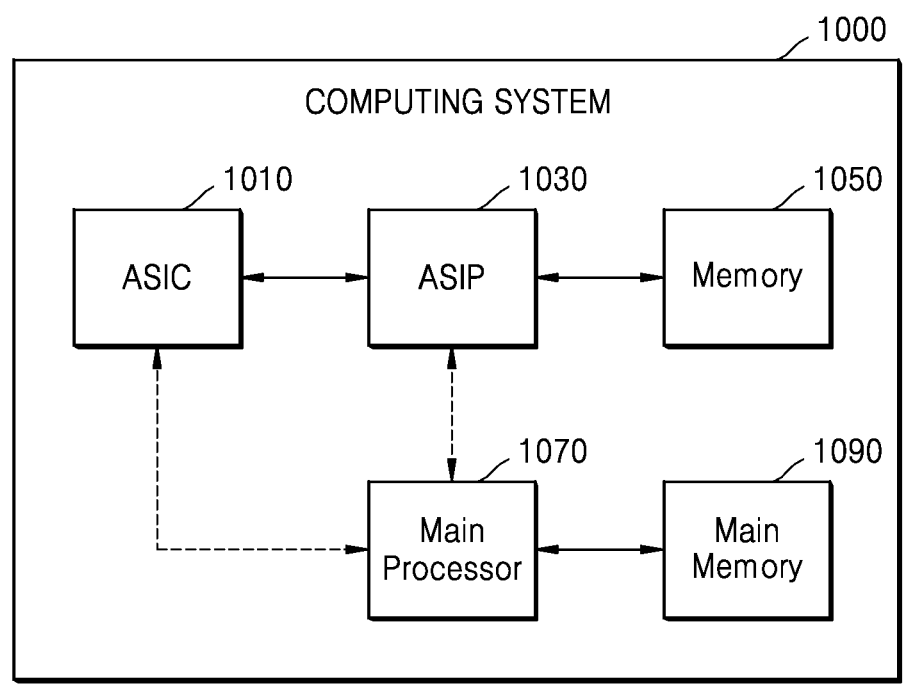
FIG. 13 is a block diagram illustrating a computing system, according to an embodiment.

FIG. 13 is a block diagram illustrating a computing system 1000 according to an embodiment.

Referring to FIG. 13, the computing system 1000 may include an application specific integrated circuit (ASIC) 1010, an application specific instruction set processor (ASIP) 1030, a memory 1050, a main processor 1070, and a main memory 1090. At least two of the ASIC 1010, the ASIP 1030, and the main processor 1070 may communicate with one another. In addition, at least two of the ASIC 1010, the ASIP 1030, the memory 1050, the main processor 1070, and the main memory 1090 may be mounted in one chip.

The ASIP 1030 as an integrated circuit customized for a specific purpose may support an instruction set only for a specific application, and may execute a plurality of instructions included in the instruction set. The memory 1050 may communicate with the ASIP 1030 and may store the plurality of instructions executed by the ASIP 1030 as a non-temporary storage device. The memory 1050 may include an optional type of memory accessible by the ASIP 1030 such as random access memory (RAM), read only memory (ROM), a tape, a magnetic disk, an optical disk, volatile memory, non-volatile memory, or a combination of the tape, the disks, and the memories. The ASIP 1030 or the main processor 1070 may measure leakage power, and may generate leakage power information as illustrated in FIG. 1 by executing a series of instructions stored in the memory 1050.

The main processor 1070 may control the computing system 1000 by executing the plurality of instructions. For example, the main processor 1070 may control the ASIC 1010 and the ASIP 1030, and may process data received through a wireless communication network or a user input to the computing system 1000. The main memory 1090 may communicate with the main processor 1070, and may store the plurality of instructions for measuring the leakage power and for generating the leakage power information according to the embodiments, which are executed by the main processor 1070, as a non-temporary storage device.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units (collectively "components" in this paragraph) represented by a block in the drawings, for example, the leakage power management module 420 and the scheduler 450 in FIG. 12, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While the inventive concept has been particularly shown and described with reference to embodiments thereof, it will be understood that various changes in form and details may be made therein without departing from the spirit and scope of the following claims.

What is claimed is:

1. A method of operating a computing device including a processing component, the method comprising:
obtaining power mode information about the processing component;
measuring a temperature of the processing component and a current that flows through the processing component in response to the obtaining the power mode information;
generating leakage power information based on the power mode information and the measured temperature and current; and
scheduling a task of the processing component based on the leakage power information,
wherein the measuring the temperature and the current further comprises:
checking whether a power mode of the processing component changes before completing an operation of the measuring the temperature and the current; and
determining whether the measured temperature and current are valid based on a result of the checking.

2. The method of claim 1, wherein the power mode information comprises information about a new power mode when the power mode of the processing component changes to the new power mode.

3. The method of claim 2, wherein the measuring the temperature and the current comprises starting to measure the temperature and the current when the processing component enters the new power mode based on the power mode information.

4. The method of claim 1, wherein the determining whether the measured temperature and current are valid comprises determining that the measured temperature and current are not valid in response to determining that the power mode of the processing component changes before completing the operation of the measuring the temperature and the current.

5. The method of claim 1, wherein the generating the leakage power information further comprises:
when power consumption in the power mode of the processing component comprises a dynamic power component, modifying at least one of the measured temperature and current considering the dynamic power component; and
generating the leakage power information by using a result of the modifying,
wherein the power consumption further comprises a leakage power component in a running mode of the processing component in which a clock supply path to the processing component and a power supply path to the processing component are turned on.

6. The method of claim 1, further comprising storing the generated leakage power information in a memory,
wherein the storing the leakage power information in the memory comprises updating a leakage power table stored in the memory by using the leakage power information.

7. The method of claim 6, further comprising
reading the stored leakage power information from the memory; and
performing task scheduling for the processing component based on the read leakage power information.

8. The method of claim 7, further comprising:
measuring a current temperature of the processing component;
extracting, from the read leakage power information, information about a current corresponding to a current power mode of the processing component and the measured current temperature; and
estimating leakage power in the processing component based on the extracted information about the current for the performing the task scheduling.

9. The method of claim 7, wherein the power mode information comprises information about the power mode among a plurality of power modes, and
wherein the plurality of power modes comprise a running mode in which a clock supply path to the processing component and a power supply path to the processing component are turned on, a stop mode in which the clock supply path is turned off and the power supply path is turned on, and a power-off mode in which the clock supply path and the power supply path are turned off.

10. A computing device comprising:
a processing component;
a memory configured to store a leakage power table comprising information about a plurality of power modes of the processing component; and at least one processor configured to control the processing component, and implements a leakage power management module to manage the leakage power table for the processing component, wherein the leakage power management module is configured to measure a temperature of the processing component and a current which flows through the processing component by a power mode of the processing component, and manage the leakage power table by using information about the temperature and the current, wherein the leakage power management module is further configured to check whether the power mode of the processing component changes before completing an operation of the measuring the temperature and the current, and determine whether the measured temperature and current are valid based on a result of the checking, and wherein the at least one processor is configured to implement a scheduler that performs scheduling a task of the processing component based on information from the leakage power table.

11. The computing device of claim 10, wherein the leakage power management module is further configured to modify at least one of the temperature and the measured current based on the power mode, among the plurality of power modes, of the processing component.

12. The computing device of claim 11, wherein, when power consumption in the power mode of the processing component comprises a dynamic power component, wherein the leakage power management module is configured to modify the at least one of the temperature and the current considering the dynamic power component, and wherein the power consumption further comprises a leakage power component in a running mode of the processing component in which a clock supply path to the processing component and a power supply path to the processing component are turned on.

13. The computing device of claim 10, wherein the leakage power management module is configured to detect a time point at which the power mode, among the plurality of power modes, of the processing component changes, and control to start to measure the temperature and the current at the detected time point.

14. The computing device of claim 10, wherein, when the information about the temperature and the current is obtained after the power mode of the processing component changes to a new power mode, among the plurality of power modes, the leakage power management module is configured to invalidate the measured temperature and the measured current.

15. The computing device of claim 10, wherein the scheduler is configured to extract, from the leakage power table, information about a current corresponding to a current power mode of the processing component and a current temperature of the processing component, estimate leakage power of the processing component from the extracted information about the current, and perform the scheduling of the task of the processing component based on a result of estimation.

16. A processor controlling a leakage power management module which is implemented by using at least hardware, the leakage power management module being configured to:

obtain power mode information about a processing component;

measuring a temperature of the processing component and a current which flows through the processing component in response to the obtaining the power mode information;

generate leakage power information based on the temperature and the current; and provide the leakage power information to an external component or device, which schedules a task of the processing component based on the leakage power information, wherein the measuring the temperature and the current comprises:

checking whether a power mode of the processing component changes before completing an operation of the measuring the temperature and the current; and determining whether the measured temperature and current are valid based on a result of the checking.

17. The processor of claim 16, wherein the power mode information comprises information about the power mode to which the processing component enters and information about a time point at which the processing component enters the power mode, and wherein the power mode is one of a plurality of power modes set to the processing component.

18. The processor of claim 16, wherein the processor is further configured to update the leakage power information when the processing component enters a new power mode among a plurality of power modes by obtaining information about a new temperature of the processing component and a new current which flows through the processing component, and wherein the new power mode is a predetermined target power mode.

* * * * *